(12) United States Patent
Soriano et al.

(10) Patent No.: US 10,135,649 B2
(45) Date of Patent: Nov. 20, 2018

(54) SYSTEMS AND METHODS FOR PERFORMING MULTI-LEVEL CODING IN A DISCRETE MULTITONE MODULATION COMMUNICATION SYSTEM

(71) Applicant: Marvell World Trade Ltd., St. Michael (BB)

(72) Inventors: Carlos Camps Soriano, Xirivella (ES); Salvador Iranzo Molinero, Betera (ES)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 15/487,004

(22) Filed: Apr. 13, 2017

(65) Prior Publication Data
US 2018/0069734 A1 Mar. 8, 2018

Related U.S. Application Data

(60) Provisional application No. 62/383,050, filed on Sep. 2, 2016.

(51) Int. Cl.
| | |
|---|---|
| *H04L 5/12* | (2006.01) |
| *H04L 27/00* | (2006.01) |
| *H04L 1/00* | (2006.01) |
| *H04L 5/00* | (2006.01) |
| *H04L 27/34* | (2006.01) |
| *H04L 27/26* | (2006.01) |

(52) U.S. Cl.
CPC ........ *H04L 27/0008* (2013.01); *H04L 1/0041* (2013.01); *H04L 1/0058* (2013.01); *H04L 5/006* (2013.01); *H04L 5/0046* (2013.01); *H04L 27/3416* (2013.01); *H04L 27/3483* (2013.01); *H04L 27/2601* (2013.01)

(58) Field of Classification Search
CPC ... H04L 27/0008; H04L 1/0041; H04L 5/006; H04L 27/3483; H04L 27/2601
USPC .......................................................... 375/261
See application file for complete search history.

(56) References Cited

U.S. PATENT DOCUMENTS

| | | | | |
|---|---|---|---|---|
| 6,115,427 | A | * | 9/2000 | Calderbank ............ C07K 14/78 375/240 |
| 6,952,394 | B1 | * | 10/2005 | Kim ...................... H04L 1/0071 370/208 |

(Continued)

OTHER PUBLICATIONS

"G.gen: LDPC coding proposal for G.dmt.bis and G.lite.bis.," Clearwater, Florida, Jan. 8-12, 2001, IBM, ITU—Telecommunication Standardization Sector, Temporary Document CF-061, Study Group 15, Question 4/15, 13 pages.

(Continued)

*Primary Examiner* — Helene Tayong

(57) ABSTRACT

Embodiments described herein provide a method for performing multi-level coding in a discrete multitone modulation (DMT) communication system. A plurality of data bits are divided into a first number of un-encoded bits and a set of bits to be encoded. The set of bits to be encoded are encoded into a second number of encoded bits. The first number is different from the second number, and the first number is an even number or an odd number. The first number of un-encoded bits and the second number of encoded bits are mapped into a plurality of constellation points. The plurality of constellation points are transmitted as orthogonal frequency-division multiplexing (OFDM) symbols.

18 Claims, 12 Drawing Sheets

(56) References Cited

U.S. PATENT DOCUMENTS

| | | | | |
|---|---|---|---|---|
| 6,985,536 | B2* | 1/2006 | Oelcer | H04L 1/0057 |
| | | | | 375/259 |
| 7,831,887 | B2* | 11/2010 | Joyce | H03M 13/1111 |
| | | | | 714/758 |
| 2002/0136318 | A1* | 9/2002 | Gorokhov | H04L 1/005 |
| | | | | 375/261 |
| 2007/0019753 | A1 | 1/2007 | Kim | |
| 2009/0135946 | A1* | 5/2009 | Dowling | H04L 25/03203 |
| | | | | 375/286 |
| 2014/0153625 | A1* | 6/2014 | Vojcic | H04L 1/005 |
| | | | | 375/224 |

OTHER PUBLICATIONS

Eleftheriou E. et al., "Accepted From Open Call—Application of Capacity-Approaching Coding Techniques to Digital Subscriber Lines", 42:88-94 (2004) IEEE Communications Magazine, IEEE Service Center, Piscataway, US.

Eleftheriou E. et al., "Low-density parity-check codes for digital subscriber lines", 3:1752-1757 (2002) Proceedings of IEEE International Conference on Communications—Apr. 28-May 2, 2002—New York, NY, USA, IEEE, Piscataway, NJ, USA.

Imai H. et al., "A New Multilevel Coding Method Using Error-Correcting Codes", IT-23:371-377 (1977) IEEE Transactions on Information Theory, IEEE Press, USA.

Anonymous: "Orthogonal frequency-division multiplexing—Wikipedia, the free encyclopedia", Jun. 27, 2015 (Jun. 27, 2015), XP055259073, Retrieved from the Internet: URL:https://en.wikipedia.org/w/index.php?title=Orthogonal_frequency-division_multiplexing&oldid=668934804 [retrieved on Mar. 17, 2016].

\* cited by examiner

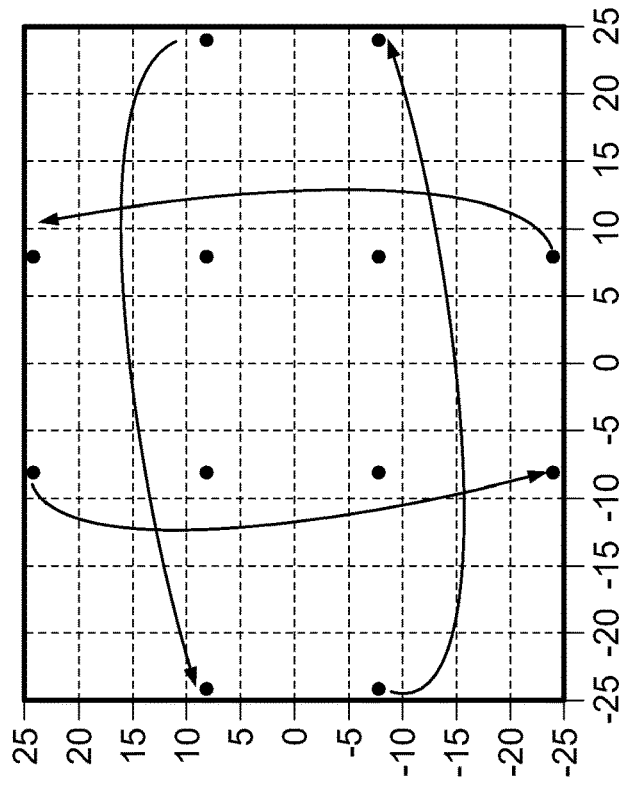

SYSTEMS AND METHODS FOR PERFORMING MULTI-LEVEL CODING IN A DISCRETE MULTITONE MODULATION COMMUNICATION SYSTEM

CROSS-REFERENCE TO RELATED APPLICATION

This disclosure claims the benefit under 35 U.S.C. § 119(e) of U.S. Provisional Patent Application No. 62/383,050, filed Sep. 2, 2016, which is hereby incorporated by reference herein in its entirety.

FIELD OF USE

This disclosure relates to an encoding/decoding scheme in a communication system, and specifically, to performing multi-level coding in a discrete multitone modulation (DMT) communication system.

BACKGROUND OF THE DISCLOSURE

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

Discrete multitone modulation is widely used in digital television and audio broadcasting, digital subscriber line (DSL) Internet access, wireless networks, powerline networks, and 4G mobile communications. In a DMT system, incoming data is collected and then distributed over a large number of small individual carriers, each of which uses a form of quadrature amplitude modulation (QAM) modulation. A DMT transmitter usually includes a forward-error correction encoder that encodes all data to be transmitted into encoded bits before mapping the encoded bits into the subcarriers. After tone mapping, a constellation encoder is then used to distribute the encoded bits into a selected constellation. Then, an OFDM modulator is used to modulate data symbols from the constellation into OFDM symbols.

At a DMT receiver, a constellation decoder is usually used to decode received data symbols. FEC decoders are used to decode the recovered encoded data symbols from the received data symbols. When the throughput of the system is high, e.g., 10 gigabits per second (Gbps), the implementation of FEC decoder is challenging. Specifically, hardware requirements for an iterative decoder such as low-density parity check (LDPC) decoders are difficult to satisfy, because the required circuit area of the decoder increases linearly when the throughput grows.

In addition, the FEC encoding/decoding scheme usually achieves a limited coding rate. In a G.hn network, for example, the mother code of the adopted LDPC has a higher code rate of 5/6, i.e., for every five bits of useful information, the FEC encoder generates a total six bits of data. However, when a higher code rate such as 16/18 or 20/21 is desired, the decoding becomes less efficient because the burden to the FEC decoder increases significantly.

SUMMARY

Embodiments described herein provide a method for performing multi-level coding in a DMT communication system. A plurality of data bits are divided into a first number of un-encoded bits and a set of bits to be encoded. The set of bits to be encoded are encoded into a second number of encoded bits. The first number is different from the second number, and the first number is an even number or an odd number. The first number of un-encoded bits and the second number of encoded bits are mapped into a plurality of constellation points. The plurality of constellation points are transmitted as orthogonal frequency-division multiplexing (OFDM) symbols.

In some implementations, adaptive bitloading information is obtained indicative of a total number of bits to be loaded and the number of un-encoded bits, the adaptive bitloading information being generated based at least in part on channel signal-to-noise ratio (SNR) condition. The plurality of data bits are divided into the first number of un-encoded bits and the set of bits to be encoded based on the adaptive bitloading information.

In some implementations, the first number of un-encoded bits are mapped into a first set of un-encoded constellation points. The second number of encoded bits are mapped into a second set of encoded constellation points, wherein the first set of un-encoded constellation points has a different scale from the second set of encoded constellation points.

In some implementations, the first set of un-encoded constellation points are scaled by a value equivalent to a square root of a value equivalent to $2^{the\ second\ number}$ to obtain a scaled set of un-encoded constellation points.

In some implementations, each scaled un-encoded constellation point from the scaled set of un-encoded constellation points is added to each encoded constellation point from the second set of encoded constellation points to obtain the plurality of constellation points.

In some implementations, when the first number equals one or three, the plurality of constellation points having a first constellation shape and a first power attribute, are transformed into a second plurality of constellation points having a second constellation shape and a second power attribute. The second power attribute is smaller than the first power attribute of the first constellation shape.

In some implementations, when the number of the un-encoded bits equals one, a subset of the plurality of constellation points are rearranged to form the second plurality of constellation points having a diamond shape.

In some implementations, when the number of the un-encoded bits equals three, a subset of the plurality of constellation points are rearranged to form the second plurality of constellation points having a cross shape.

In some implementations, a plurality of soft symbols are generated from a plurality of received symbols. The second number of encoded bits from the plurality of soft symbols are recovered, and the second number of encoded bits are decoded into the set of bits to be encoded based on log-likelihood ratio calculation.

In some implementations, the first number of un-encoded bits are recovered from the plurality of soft symbols based at least in part on a constellation generated by the second number of encoded bits. The first number of un-encoded bits and the set of bits to be encoded are mixed as an output of data bits.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which:

FIGS. 9-10 are block diagrams illustrating additional transformation of an un-encoded constellation when the number of un-encoded bits is one or three, respectively, according to some embodiments described herein;

DETAILED DESCRIPTION

This disclosure describes methods and systems for providing a multi-level coding scheme in a DMT system that is suitable for use in a G. Hn compliant network. Specifically, the multi-level coding scheme selects a subset of data bits to encode, and then generates a mix of encoded and un-encoded data bits for modulation and transmission, instead of encoding all data bits to be transmitted.

In this way, while some data bits are encoded using an FEC code and some data bits are transmitted without FEC encoding, a mix of encoded bits and un-encoded bits are distributed into every subcarrier, e.g., a carrier wave that is to be modulated by a signal wave an then to be used with other subcarrier waves to be modulated onto the main carrier wave. Adaptive bitloading information, indicative of the channel SNR condition at a specific subcarrier, is used to indicate how many data bits are to be loaded per subcarrier. As such, the number of encoded bits and the number of un-encoded bits can vary per subcarrier.

Although data bits to be transmitted are divided into encoded bits and un-encoded bits, the mix of encoded bits and un-encoded bits per each subcarrier is mapped by a constellation encoder to modulated constellation symbols in a specific constellation, e.g., QAM. The modulated constellation symbols are transmitted such that the encoded bits and un-encoded bits yield similar bit error rates, and thus error performance is not compromised while only a portion of the data bits are encoded by the FEC encoder. In this way, as the number of data bits that an FEC decoder needs to decode at the receiver is only the number of encoded bits, instead of all data bits that are transmitted. As such, because less than all of the transmitted data bits are encoded the complexity of the FEC decoder is thus reduced. Also, as a number of un-encoded bits are transmitted without FEC encoding, the effective coding rate of the system is increased.

In some implementations, when the number of un-encoded bits is a small odd number, e.g., one or three, the resulting encoded constellation of the mixed un-encoded and encoded data bits may have a rectangular or other less square-like shape, which impairs the power efficiency of data transmission. The coding scheme, according to some embodiments, is configured to transform such constellation to a constellation with a more power-efficient shape, e.g., cross, diamond shape, etc., to improve power efficiency and system performance.

Figure 1:
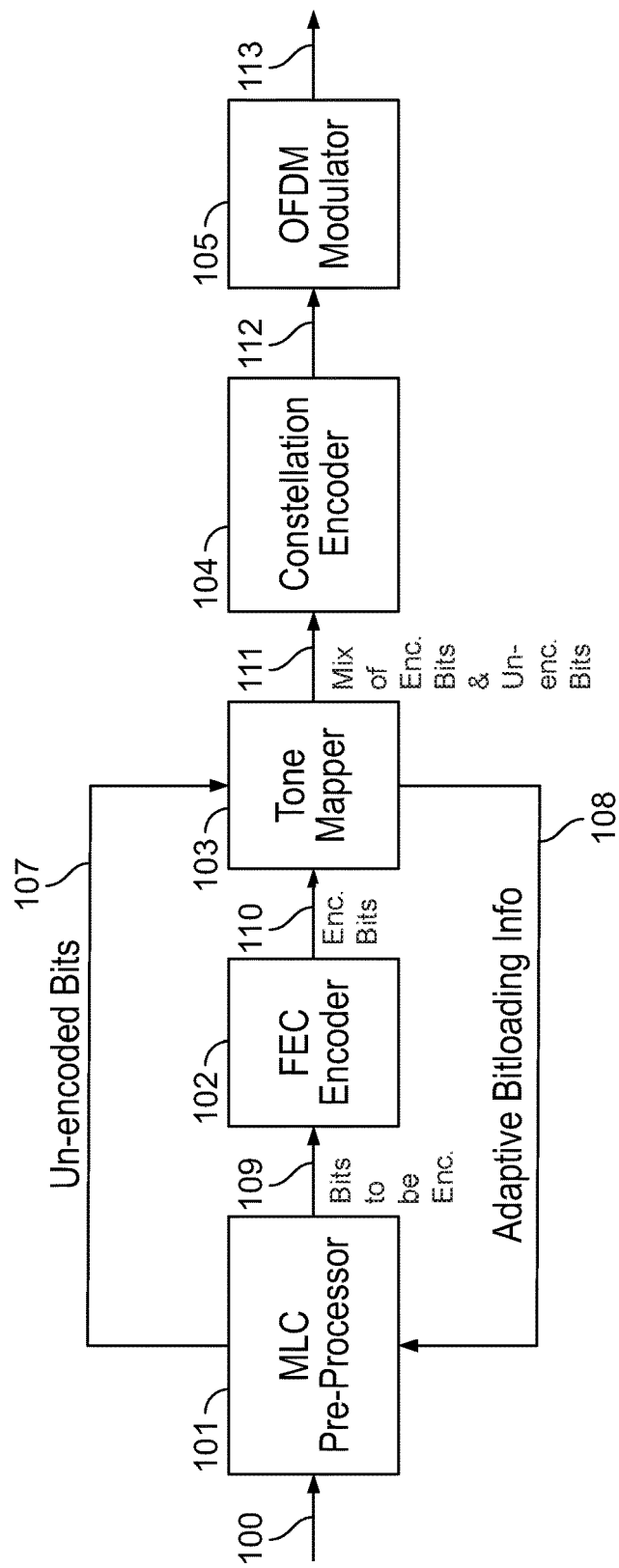
FIG. 1 is a block diagram illustrating an example structure of a multi-level coding transmitter in a DMT system that selectively encodes a portion of the data bits and then maps a mix of encoded bits and un-encoded bits into constellation symbols, according to some embodiments described herein.

FIG. 1 is a block diagram illustrating an example structure of a multi-level coding transmitter in a DMT system that selectively encodes a portion of the data bits and then maps a mix of encoded bits and un-encoded bits into constellation symbols, according to some embodiments described herein. At a DMT transmitter as shown in FIG. 1, a multi-level coding (MLC) pre-processor 101 receives data bits 100 to be transmitted, e.g., un-encoded data bits from a data source, etc. The MLC pre-processor 101 is configured to separate the data bits 100 into un-encoded bits 107 and bits to be encoded 109 per subcarrier, based on adaptive bitloading information 108. When dividing the data bits, the MLC Preprocessor is configured to consider redundancy or parity bits that will be appended to the bits to be encoded at the FEC Encoder. Therefore, the total number of encoded bits that are to be mapped into subcarriers at a tone mapper 103 is equal to the number of bits to be encoded plus the number of redundancy parity bits to be appended by the FEC Encoder. For example, for a code rate of 5/6, the FEC encoder will add one bit to every five data bits to be encoded. Thus, the MLC pre-processor 101 assigns five bits as data bits to be encoded if the number of encoded bits is six.

The adaptive bitloading information 108 is obtained as feedback from an upper layer of the communication system, and is also used by the tone mapper 103. For example, the upper layer of the communication system observes channel SNR condition of each subcarrier, based on which the adaptive bitloading information is generated. The adaptive bitloading information 108 includes a respective number indicative of how many data bits will be mapped into each respective subcarrier, and a number indicative of how many bits of the total number of bits to be mapped into a subcarrier will be encoded, e.g., the number of bits that are to be encoded is the same for all subcarriers; or alternatively is different per subcarrier.

The data bits to be encoded 109 are then passed to the FEC encoder 102, which is configured to encode the data bits into encoded bits 110 using a pre-selected or preconfigured error correcting code. The un-encoded bits 107 are passed directly to the tone mapper 103.

The tone mapper 103 is configured to receive the un-encoded bits 107 from the MLC Preprocessor 101 and the encoded bits 110 from the FEC encoder 102, and to generate a mix of the un-encoded/encoded bits. The tone mapper 103 then maps the mix of un-encoded/encoded bits into a number of subcarriers depending on adaptive bitloading. The tone mapper 103 is configured to obtain the adaptive bitloading information 108 from the upper layer of the communication, which determines the adaptive bitloading information 108 based on the channel SNR condition of a respective subcarrier in an embodiment. For example, when the SNR of a specific subcarrier is satisfactory, a greater number of data bits are to be mapped to the specific subcarrier. When the number of encoded bits per subcarrier is fixed and pre-determined, the number of un-encoded bits is calculated by subtracting the fixed number of encoded bits from a total number of data bits to be mapped to a specific subcarrier. Thus, the number of un-encoded bits, and by extension the number of total bits, varies from one subcarrier to another. The number of total bits, the number of encoded bits, and the number of un-encoded bits, are all included in the adaptive bitloading information 108, which is provided to the MLC pre-processor 101.

Figure 2:
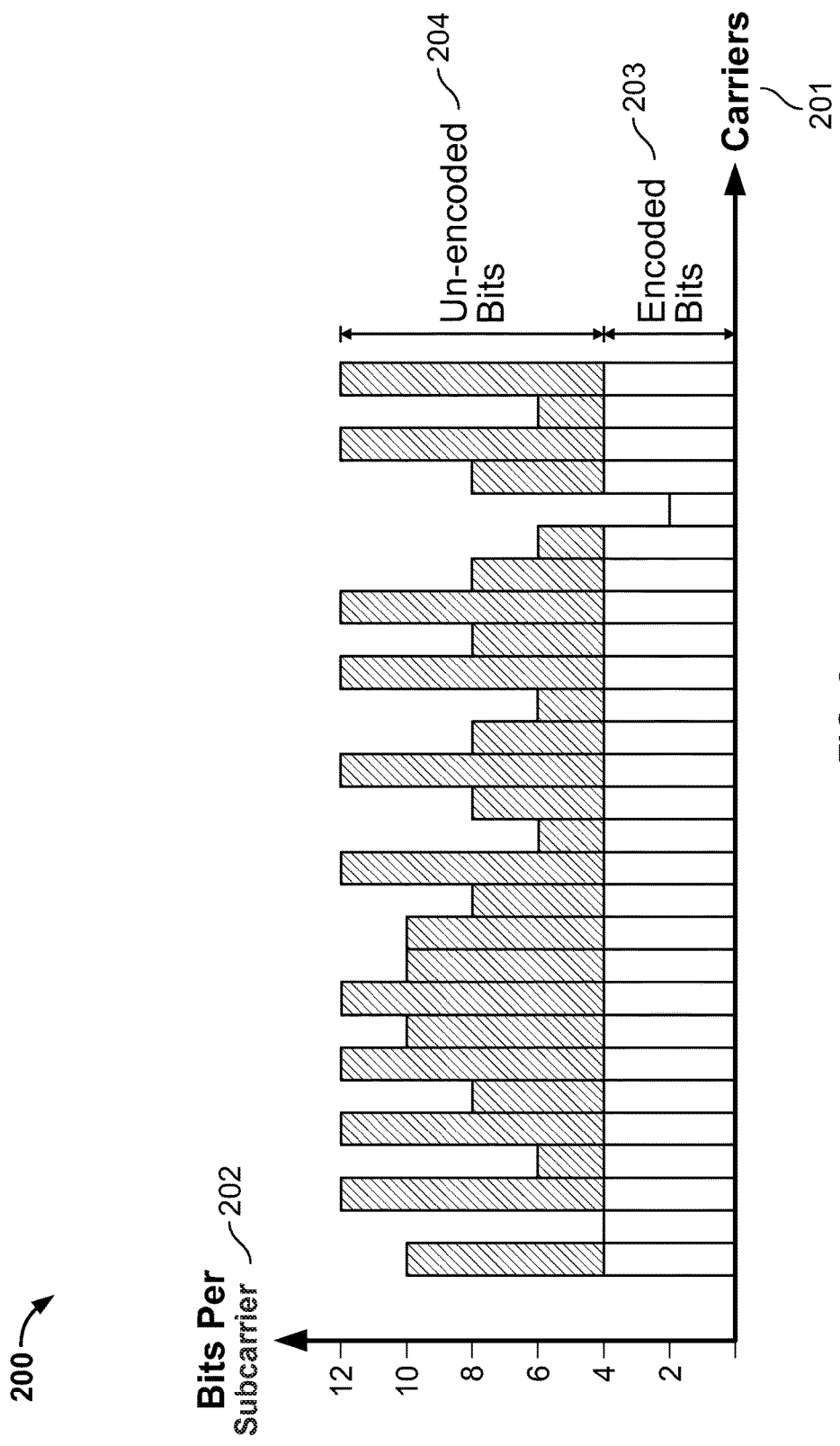
FIG. 2 is an example mapping scheme illustrating a mapping of encoded bits and un-encoded bits onto a number of subcarriers by the tone mapper shown in FIG. 1, according to some embodiments described herein.

FIG. 2 provides an example mapping scheme of mapping encoded bits and un-encoded bits onto a number of subcarriers by the tone mapper 103, according to some embodiments described herein. The x-axis 201 of a chart 200 represents a number of subcarriers, and the y-axis 202 of chart 200 represents the number of bits per subcarrier. As shown in the example of chart 200, the maximum number of encoded bits 203 per subcarrier is fixed to be four, but the number of un-encoded bits 204 varies from subcarrier to subcarrier. Although in this example the number of encoded bits is limited to four for every subcarrier, in various other embodiments a different number of encoded bits per subcarrier can be used.

Referring back to FIG. 1, the MLC pre-processor 101 is further configured to map user data divided into bits to be encoded and un-encoded bits onto a codeword, dependent on a codeword format used by the network. For example, in a G.hn network, user data is fragmented into blocks of a fixed length, e.g., Link Protocol Data Units (LPDUs). These LPDUs are mapped into codewords, e.g., one LPDU fits into one codeword. With the multi-level coding scheme, the number of encoded/un-encoded bits used by each LPDU varies depending on the adaptive bitloading information 108. The MLC pre-processor 103 does not map a single LPDU directly into a FEC codeword. Instead, in an embodiment, an LPDU is mapped to be part of a super-codeword that contains several LPDUs or pieces of LPDUs.

Figure 3:
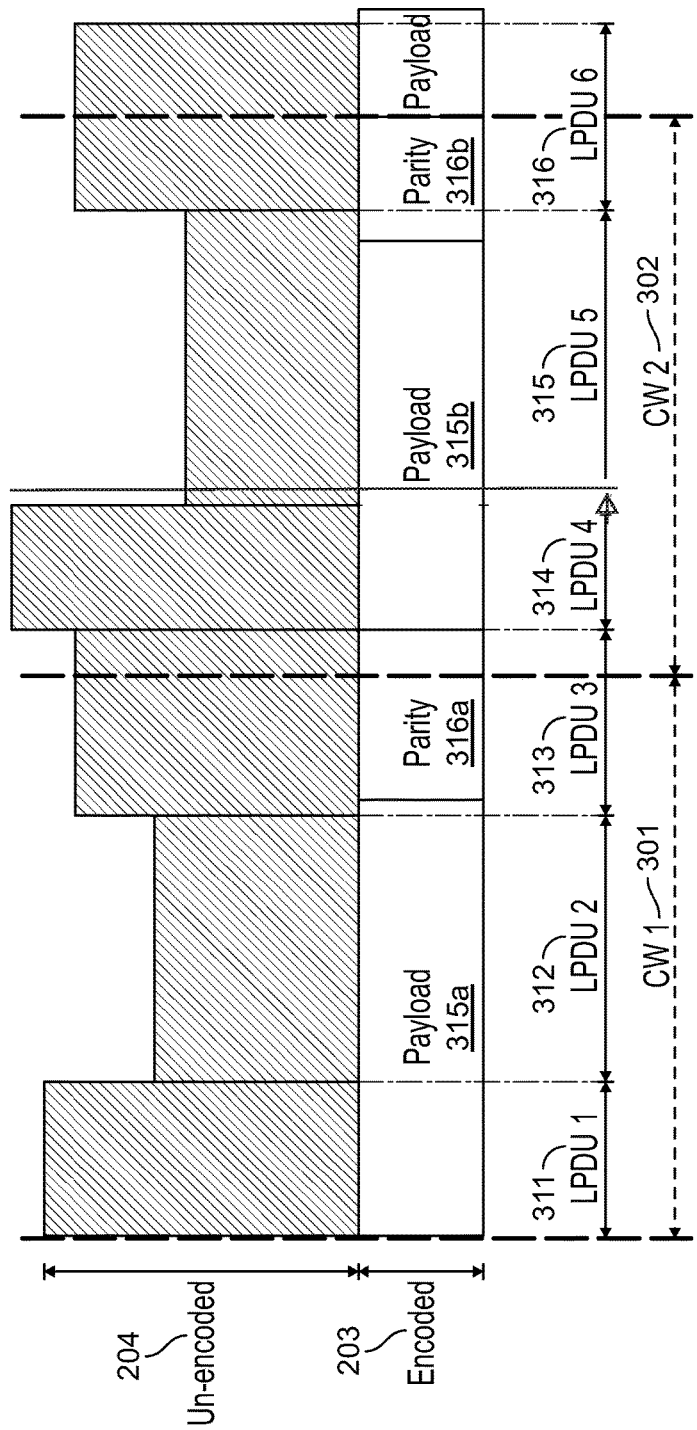
FIG. 3 is a block diagram illustrating an example codeword structure under the multi-level coding scheme shown in FIG. 1, according to some embodiments described herein.

FIG. 3 provides a block diagram illustrating an example codeword structure under a multi-level coding scheme, according to some embodiments described herein. As shown in FIG. 3, each super-codeword 301 or 302 contains encoded bits 203 and un-encoded bits 204, and is formed by one or more LPDUs. In some implementations, the LPDU has a constant number of total bits, e.g., see LPDU 1 at 311 or LPDU 3 at 313. In other implementations, the number of total bits varies within an LPDU because the bitloading information may change within the duration of the LPDU, e.g., see LPDU 4 at 314.

For example, super-codeword CW1 301 contains LPDU 1 and 2, and part of LPDU 3, and super-codeword CW2 302 contains part of LPDU 3, LPDU 4-5, and part of LPDU 6. The size of the super-codeword 301 or 302 is not a fixed value, and, in some implementations, depends on the total number of bits (coded and un-encoded bits) loaded into a specific subcarrier, which is in turn determined by the adaptive bitloading information 108 as previously discussed.

The encoded bits 203 of each super-codeword 301 or 302 contains the payload bits 315*a* or 315*b*, and the parity check bits 316*a* or 316*b*, respectively.

Referring back to FIG. 1, the tone mapper 103 is configured to send data bits 111 that have been mapped into a specific subcarrier to a constellation encoder 104, which is configured to map the data bits 111 assigned to the respective subcarrier onto constellation points.

As the data bits 111 include both encoded and un-encoded bits, the constellation encoder 104 is configured to divide the encoded and un-encoded bits from the mix of data bits 111 and map the un-encoded bits and encoded bits onto constellations in two levels. Specifically, to illustrate the two-level constellation encoding, the following parameters are defined:

k: the total number of bits of current constellation;
M: the total number of points of current constellation;
$M=2^k$;
c: the number of encoded bits (the number of encoded bits shall be an even number);
M_coded: the total number of points of encoded constellation;
$M\_coded=2^c$;
u: the number of un-encoded bits;
M_un-encoded: the total number of points of un-encoded constellation;
$M\_un\text{-}encoded=2^u$; and
$k=c+u$.

The constellation encoder 104 is configured to map the encoded bits into a first constellation point in an M_coded-QAM constellation, e.g., using the Gray coding technique that maps data bits into constellation symbols so that the binary representation of adjacent symbols differ by only one bit. The constellation encoder 104 is then configured to map the un-encoded bits into a second constellation point in an M_ un-encoded-QAM constellation. When u is odd, a pseudo-Gray mapping is used to map the u uncoded bits into a QAM of the minimum size that includes at least $2^u$ constellation points.

The resulting two constellation points are then combined to obtain a unique M-QAM point in an M-QAM constellation in the following manner: the un-encoded constellation point from the M_ un-encoded-QAM constellation is scaled onto a scaled un-encoded constellation point; The scaled un-encoded constellation point is then added to the encoded constellation point, e.g., by adding the real parts and the imaginary parts of the scaled un-encoded constellation point and the encoded constellation point, respectively, to result in a final constellation point in the M-QAM constellation. The calculation that represents the combination of the un-encoded constellation point and the encoded constellation point used to generate the final constellation point is performed, in one implementation, in accordance with the following equation:

$$\text{multi-level constellation point} = \text{un-encoded constellation point} \times \sqrt{M\_coded} + \text{encoded constellation point}.$$

In the above equation, each constellation point is a complex value and can be represented in the form of (x, y), i.e., x denotes the real part of the constellation point, and y denotes the imaginary part of the constellation point.

Figure 4:
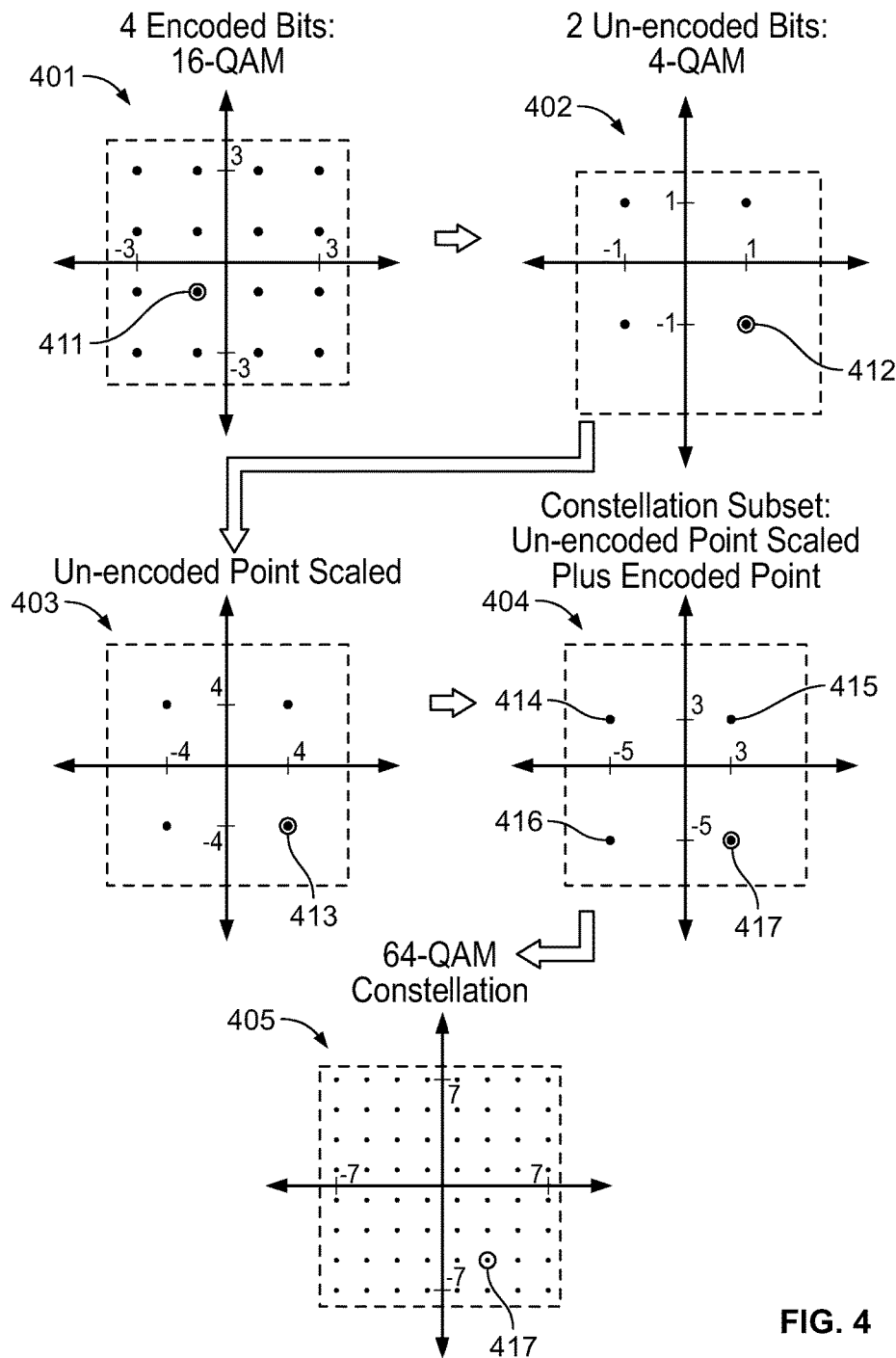
FIG. 4 is a block diagram illustrating a two-level constellation encoding example for four encoded bits and two un-encoded bits by the constellation mapper shown in FIG. 1, according to some embodiments described herein.

FIG. 4 provides a block diagram illustrating a two-level constellation encoding example for six bits, of which four bits are encoded and two bits are un-encoded, according to some embodiments described herein. In the respective example shown in FIG. 4, when c=4, and thus M_coded=$2^4$=16, the four encoded bits are then mapped to 16 constellation points in a 16-QAM constellation shown at 401. As an example, encoded constellation point 411 has the coordinates (−1, −1). For the un-encoded bits, as u=2, and thus M_un-encoded=$2^2$=4, then the two un-encoded bits are mapped to four constellation points in a 4-QAM shown at 402. As an example, un-encoded constellation point 412 has the coordinates (1, −1).

The 4-QAM 402 of un-encoded constellation points is then scaled by √M_coded=16=4 times to result in the scaled un-encoded constellation 403. The example un-encoded constellation point 412 of (1, −1) is then scaled to constellation point 413 of (4, −4). Each of the scaled un-encoded constellation points in the constellation 403 is then added to each of the encoded constellation points in the encoded constellation 16-QAM 401. For example, when the scaled un-encoded constellation points in 403 are added to the encoded constellation point 411 of (−1, −1), a constellation subset shown at 404 is obtained, including constellation point 414 of (3, −5), constellation point 415 of (3, 3), constellation point 416 of (−5, −5), and constellation point 417 of (3, −5). If the addition shown at 404 is performed for every encoded constellation point in the encoded constellation 401, the resulting constellation points, including the example constellation point 417, forms a 64-QAM constellation shown at 405.

The multi-level constellation mapping is also to be interpreted as the final constellation M-QAM, e.g., 64-QAM in this example, being divided into a number of M_coded subsets, e.g., 16 subsets in this example. For each respective subset of the 16 subsets, the un-encoded bits, e.g., two un-encoded bits in this example, are used to determine a specific constellation point within the respective subset. Because the un-encoded constellation is scaled, the distance to an adjacent point within a subset in the final constellation that represents an uncoded constellation point is multiplied by $2^{c/2}$. Hence, the two-level mapping offers an additional gain to the un-encoded bits equal to the 3×c dB.

Figure 5:
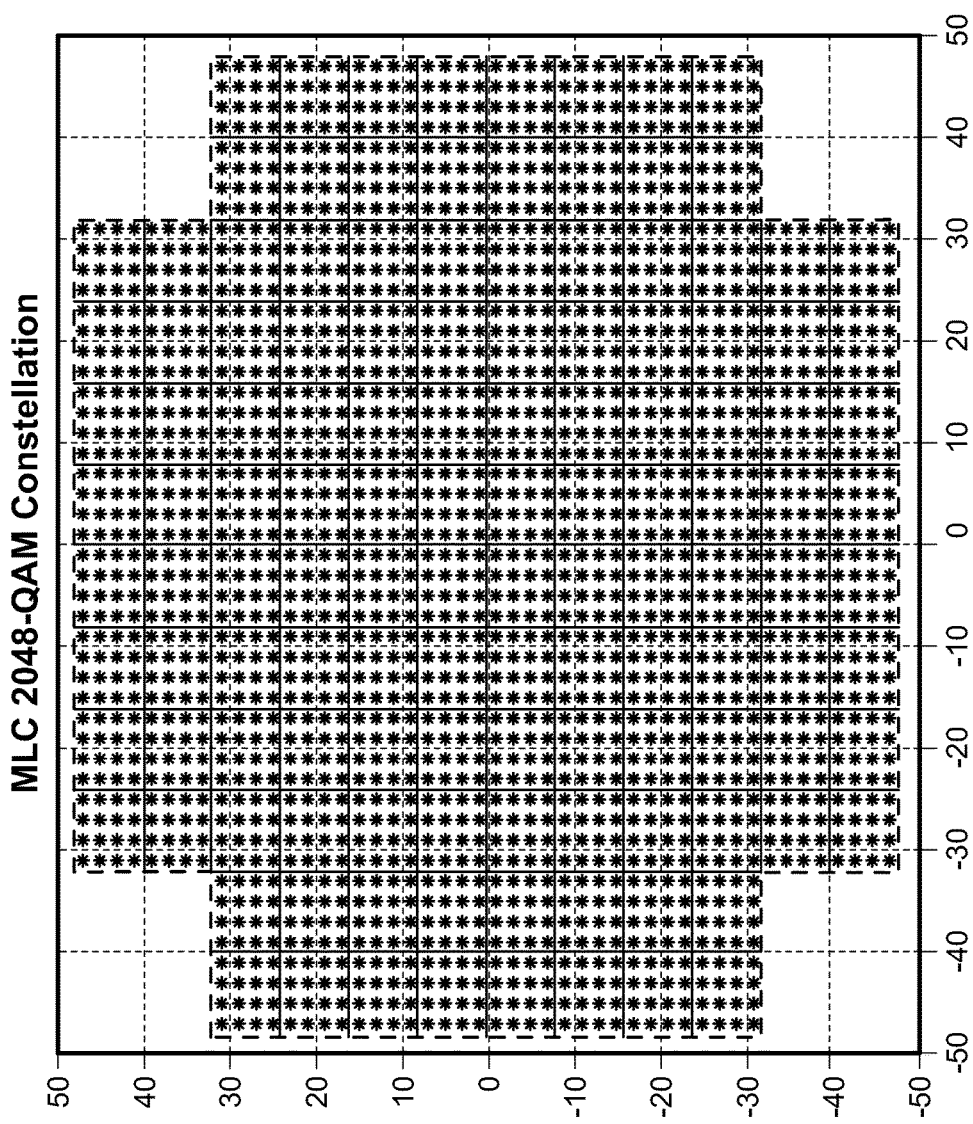
FIG. 5 is a data plot diagram illustrating an example 2048-QAM constellation for four encoded bits and seven un-encoded bits by the constellation mapper shown in FIG. 1, according to some embodiments described herein.

FIG. 5 provides a data plot diagram illustrating an example 2048-QAM constellation for four encoded bits and seven un-encoded bits, according to some embodiments described herein. In this example, the four encoded bits are mapped to a 16-QAM similar to 401 in FIG. 4. The seven un-encoded bits are mapped to a 128-QAM, which is then scaled by √16=4 times and then added to the encoded constellation points in the 16-QAM to result in the constellation points in the 2048-QAM as shown in FIG. 5. In this example, the gain obtained for the seven un-encoded bits is 3×4=12 dB, as the distance to an adjacent point within an un-encoded subset is multiplied by $2^{4/2}$=4 times.

Referring back to FIG. 1, the constellation encoder 104 is configured to adopt an additional transformation of the final constellation from the two-level coding scheme, when the number of un-encoded bits is equal to one or three. When u=1 or 3, i.e., the number of un-encoded bits is one or three, the resulting constellation points in the final constellation tend to form a less square-like shape, and thus are less power-efficient. The constellation encoder 104 is then configured to transform the less square-like constellation to a more square-like shape to improve power efficiency.

For three un-encoded bits, the final constellation after the two-level coding is transformed by "flattening" constellation points that have a relatively large real or imaginary part, e.g., constellation points that "stick" out from a square-like constellation. If the real part of the constellation point is represented by value_I, and the imaginary part of the constellation point is represented by value_Q, in an embodiment the constellation transformation is performed in a way described in the following pseudo-code:

Set bpc_in_Q=floor(k/2);
Set s=$2^{bpc\_in\_Q}$/4;
if (value_I>6×s) substract 12×s from value_I;
if (value_I<−6×s) add 12×s to value_I;
if (value_Q>6×s) substract 12×s from value_Q;
if (value_Q<−6×s) add 12×s to value_Q.

In this way, when three un-encoded bits are used, the final constellation is transformed into a cross-shaped M-QAM constellation with improved power efficiency. The gain offered by this new constellation to the un-encoded bits is equal to 3×c dB.

Figure 6:
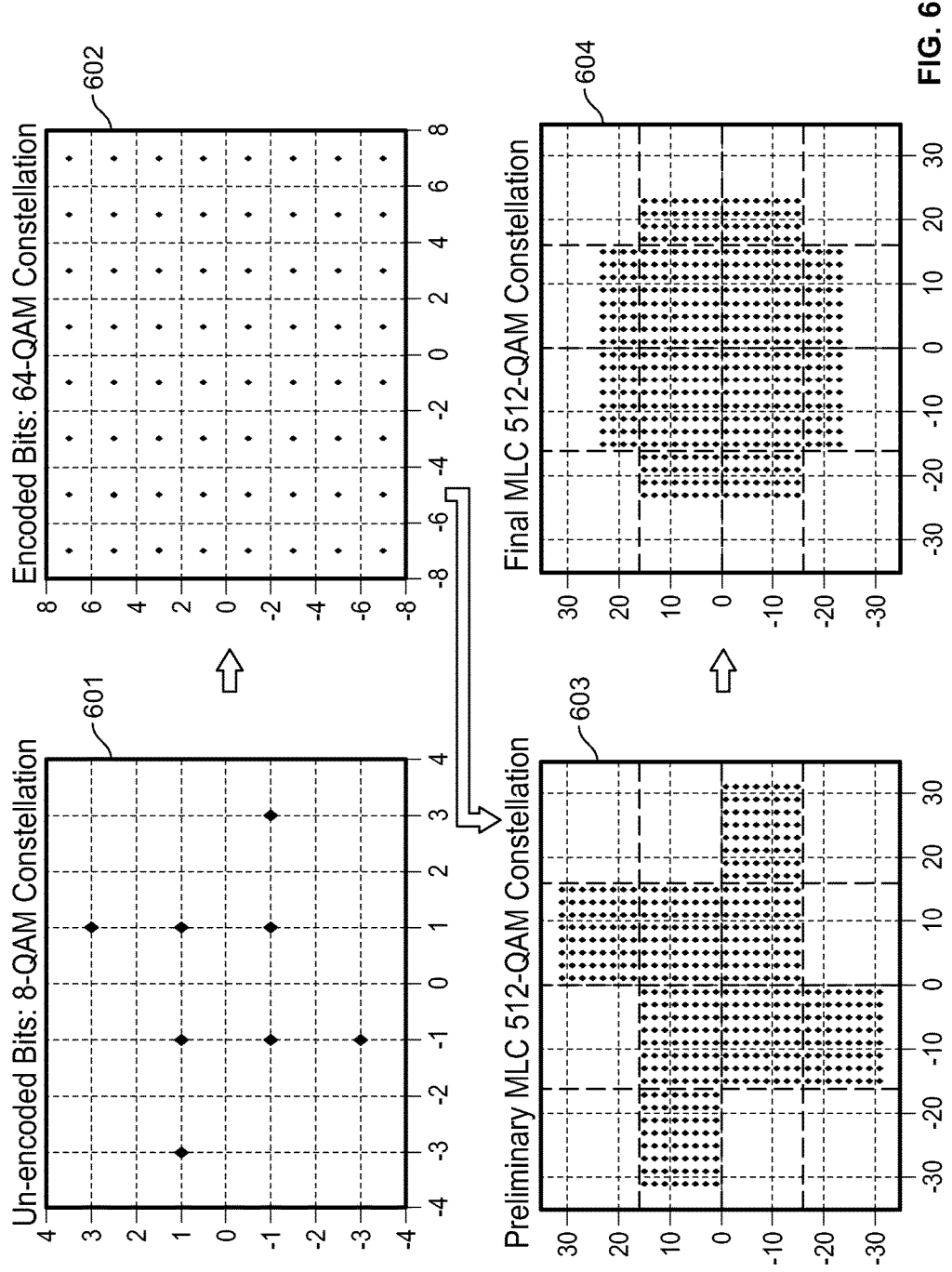
FIG. 6 is a block diagram illustrating a two-level coding scheme with additional constellation transformation for three un-encoded bits and six encoded bits by the constellation mapper shown in FIG. 1, according to some embodiments described herein.

FIG. 6 provides a block diagram illustrating a two-level coding scheme with an additional constellation transformation for three un-encoded bits and six encoded bits, according to some embodiments described herein. In this example, the three (u=3) un-encoded bits are mapped to the eight (M_un-encoded=8) constellation points in the 8-QAM as shown at 601. The six encoded bits (c=6) are mapped to 64 (M_coded=64) constellation points in the 64-QAM as shown at 602. The un-encoded constellation points in 601 are then scaled and added to the encoded constellation points in 602, in a similar manner as discussed in connection with FIG. 4, to obtain a 512-QAM 603. The constellation 603 has a less square-like shape and thus relatively is not power efficient. Upon the transformation discussed above in paragraph 0039, the constellation 603 is transformed to a cross shape at 604. The performance of the final constellation 604 has been increased by 1.11 dB with respect to the preliminary constellation 603.

For one un-encoded bit, if the sign of the real part of the constellation point is represented by sign_I and the sign of the imaginary part of the constellation is represented by sign_Q, in an embodiment, the constellation transformation is performed in a way described in the following pseudo-code:

Set bpc_in_I=ceil(k/2);
Set bpc_in_Q=floor(k/2);
If value_I>=0, set sign_I as positive; otherwise, set sign_I as negative;
If value_Q>=0, set sign_Q as positive; otherwise, set sign_Q as negative;
Set abs_value_I as the absolute value of value_I and abs_value_Q as the absolute value of value_Q;
if (value_Q<(abs_value_I−$2^{bpc\_in\_Q}$)), assign−sign_I×($2^{bpc\_in\_I}$−abs_value_I) to value_I, and add $2^{bpc\_in\_I}$ to value_Q;
Set value_Q as value_Q−$2^{bpc\_in\_Q+1}$ In this way, when only one un-encoded bit is used, the final constellation from the two-level coding scheme is transformed into a diamond-shaped M-QAM constellation (e.g., see 704 in FIG. 7) where the gain offered to the un-encoded bit is equal to 3×c dB.

Figure 7:
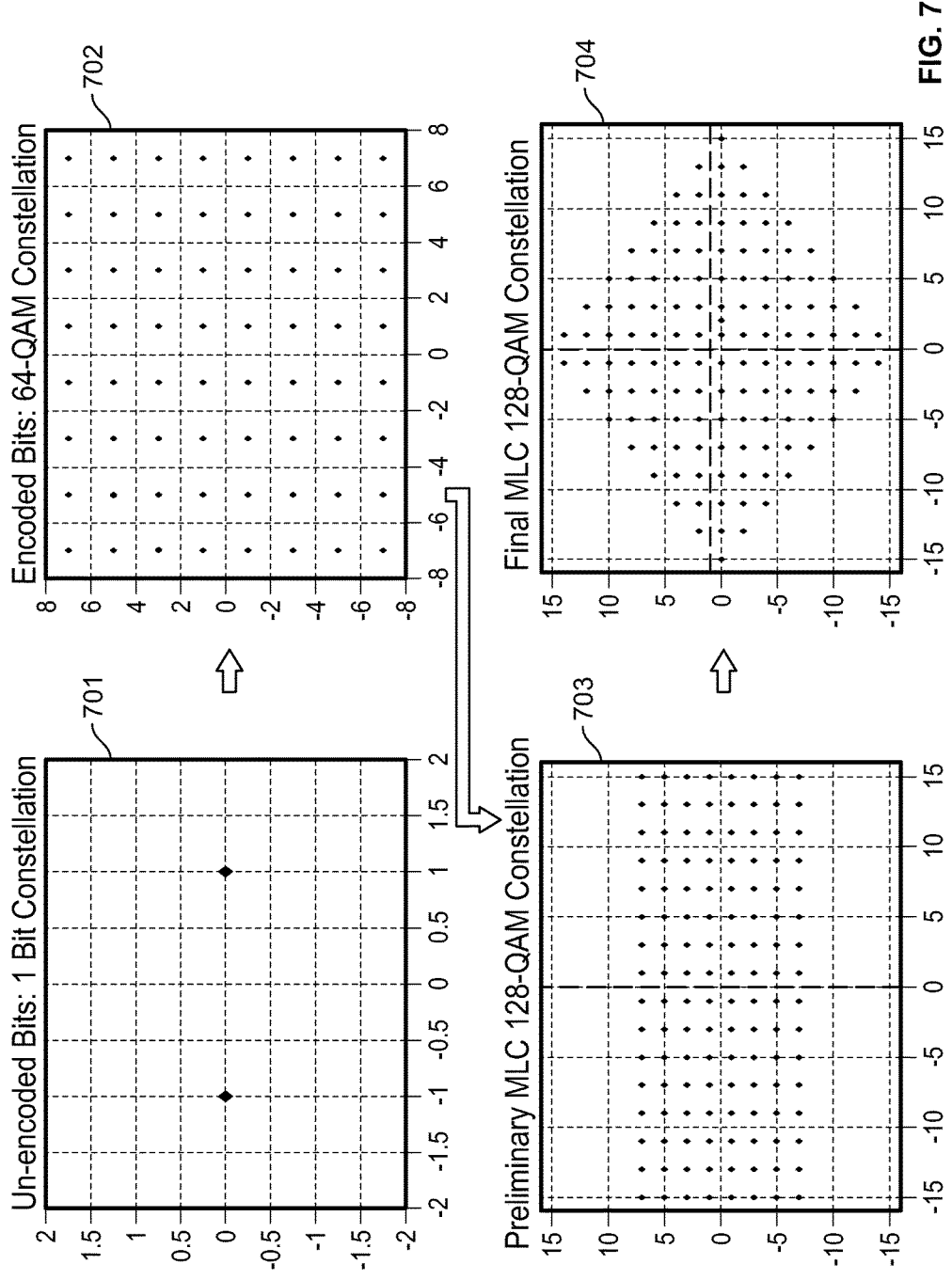
FIG. 7 is a block diagram illustrating a two-level coding scheme with additional constellation transformation for one un-encoded bit and six encoded bits by the constellation mapper shown in FIG. 1, according to some embodiments described herein.

FIG. 7 provides block diagram illustrating a two-level coding scheme with additional constellation transformation for one un-encoded bits and six encoded bits, according to some embodiments described herein. In this example, the one (u=1) un-encoded bits are mapped to the two (M_un-encoded=2) constellation points in the 1-bit constellation as shown at 701. The six encoded bits (c=6) are mapped to 64 (M_coded=64) constellation points in the 64-QAM as shown at 702. The un-encoded constellation points in 701 are then scaled and added to the encoded constellation points in 702, in a similar manner as discussed in connection with FIG. 4, to obtain a 128-QAM 703. The constellation 703 has a rectangular shape with a significant number of constellation points having a large real part, and thus the power required to transmit the constellation, which is calculated in part based on the sum of the absolute values of the constellation points, is consequently large. Thus the constellation 703 is not power efficient. Upon the transformation discussed above for one bit mapping, the constellation 703 is transformed to a diamond shape at 704. The performance of the final constellation 704 has been increased by 0.96 dB with respect to the preliminary constellation 703.

Referring back to FIG. 1, upon receiving the final constellation points 112 from the constellation encoder 104, an OFDM modulator 105 is configured to modulate the constellation points 112 into OFDM symbols 113 for transmission.

Figure 8:
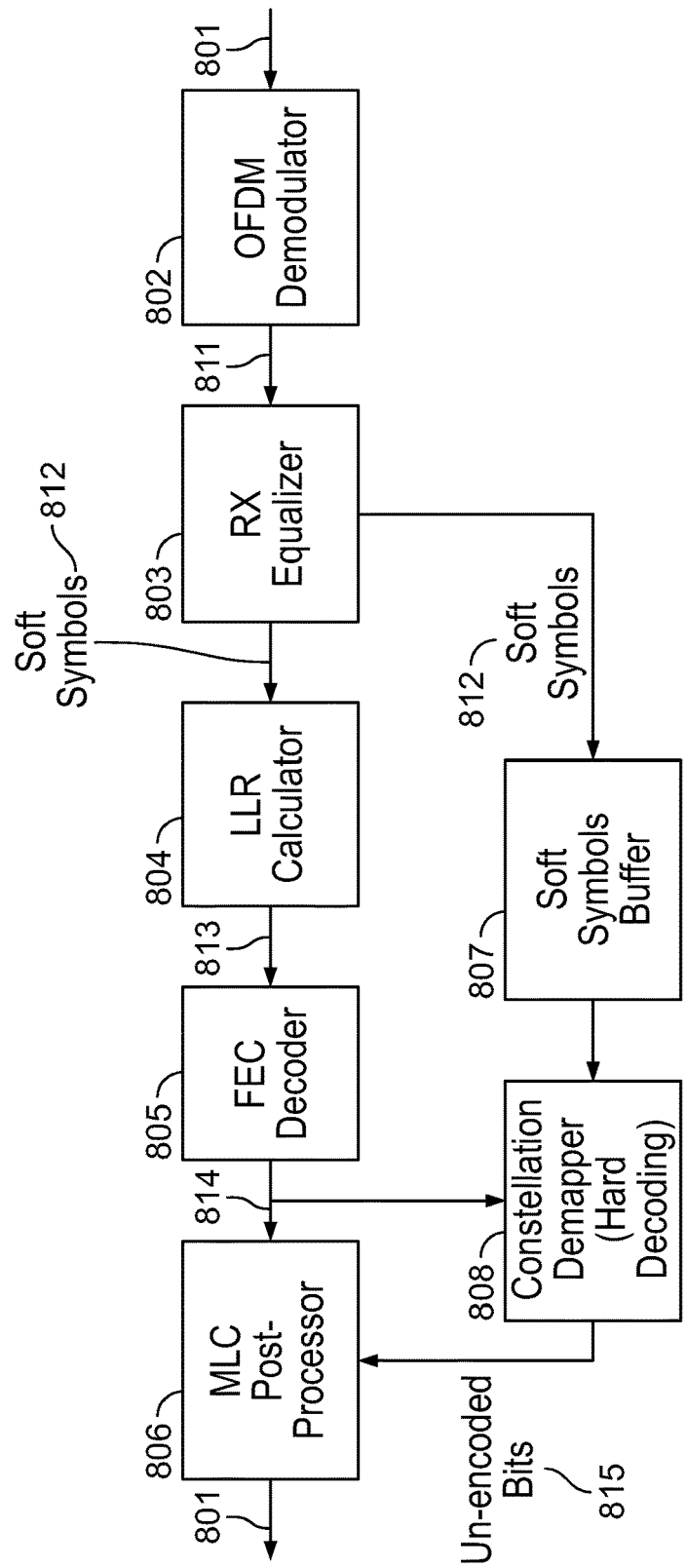
FIG. 8 is a block diagram illustrating an example structure of a multi-level coding receiver that is configured to receive and decode data symbols transmitted from a transmitter as shown in FIG. 1 in a DMT system, according to some embodiments described herein.

FIG. 8 is a block diagram illustrating an example structure of a multi-level coding receiver in a DMT system, according to some embodiments described herein. At a DMT receiver, an OFDM demodulator 802 receives OFDM symbols (with added channel noise) 801 from the transmission channel. The OFDM demodulator 802 is configured to demodulate the received OFDM symbols 801 onto demodulated data symbols 811 for the receiver (RX) equalizer 803. The RX equalizer 803 is configured to generate soft symbols 812 from the demodulated symbols 811 as follows: the RX equalizer 803 is configured to construct an estimated channel matrix (e.g., based on the channel coefficient and noise level, etc.), and take a reverse transform of the channel matrix to multiply with a vector of the demodulated symbols 811 from the OFDM demodulator to result in a vector of soft symbols 812. The soft symbols 812 are then passed to an LLR calculator 804 and are stored for post-processing to recover the un-encoded bits.

The LLR calculator 804 is configured to calculate the LLRs corresponding to the c encoded bits. In order to calculate LLRs properly, the whole constellation, e.g., the final constellation 405 in FIG. 4, 604 in FIG. 6 or 704 in FIG. 7 is considered, and the LLR indicates a likelihood that the soft symbol 812 is within any of the $2^c$ subsets of the final constellation.

The encoded bits 813 with the calculated LLR values are then passed on to the FEC decoder 805, which is configured to decode the encoded bits to recover the original bits 814 before FEC encoding.

The FEC decoder 805 is configured to recover both the payload bits and the parity or redundancy bits (that are appended to the data bits to be encoded at the FEC encoder 102 shown in FIG. 1) based on the LLR information from 813. The LLRs informs about probabilities of having received a 0 or a 1. The FEC Decoder 805 is configured to process the LLRs, e.g., the probabilities of 0 or 1, to recover the original bits to be encoded (plus the appended parity or redundancy bits), e.g., see 814.

The soft symbols 812 are also passed to a soft symbol buffer 807, which in turn sends the soft symbols 812 to a constellation demapper 808. The constellation demapper 808 is configured to recover the original u un-encoded bits with information of the encoded bits 814. In an embodiment, the constellation demapper 808 is configured to transform the received soft symbols in two steps: first, an encoded constellation point that is calculated from the encoded bits 813 is subtracted from the soft symbol. This is equivalent to remodulating the encoded bits 813 to select a subset in the final constellation. Second, the subtraction result is then scaled by 1/√M_coded to recover an M_ un-encoded-QAM constellation point. This resulting shifted and reversely scaled M_ un-encoded-QAM constellation point is then hard-demodulated with an M_ un-encoded-QAM demodulator to obtain the un-encoded bits 815.

The un-encoded bits 815 and the decoded bits 814 are then passed to the MLC post-processor 806, which is configured to mix the decoded bits and the un-encoded bits in the correct order and generate a received data output 801.

In some implementations, the constellation demapper 808 is configured to determine whether the number of un-encoded bits is one or three. Due to the additional transformation performed at the constellation encoder 104 in FIG. 1, some of the constellation points are doubled. For example, as shown in FIG. 9, when u=1, the two un-encoded constellation points are doubled as four constellation points by the additional transformation to form a diamond-shaped constellation 704 in FIG. 7; as shown in FIG. 10, when u=3, four of the eight un-encoded constellation points are doubled to result in a total of 12 constellation points by the additional transformation to form a cross-shaped constellation 604 in FIG. 6. Thus once the soft symbols obtained from 807 are shifted and reversely scaled as described above, when the number of un-encoded bits equals 1 or 3, an additional transformation before hard-demapping is performed to recover the un-encoded bits. In some implementations, the constellation demapper 808 is configured to assign the same un-encoded bits to constellation points that are doubled versions from the original constellation points.

In an alternative implementation, the constellation demapper 808 is configured to perform calculations to recover the original constellation for the un-encoded bits as described below. When the number of un-encoded bits is equal to 1, instead of obtaining a binary phase-shift keying (BPSK) constellation, a constellation similar to a quadrature phase-shift keying (QPSK), e.g., four points instead of two (similar to FIG. 9), is formed. The value of the un-encoded bit is assigned to 1 in two points of the QPSK constellation, and equal to 0 in the other two points in the QPSK constellation. In order to obtain a BPSK to hard-demap the un-encoded bit, the additional transformation is performed as follows:

Set Value_I as the real part of the transformed soft symbol;
Set Value_Q as the imaginary part of the transformed soft symbol;
assign Value_Q as Value_Q−1/sqrt(M_coded);
If ((Value_I>0) and (Value_Q>0)), assigned Value_I as −1 and Value_Q as 0;
If ((Value_I>0) and (Value_Q<0)), assign Value_I as 1 and Value_Q as 0;
If ((Value_I<0) and (Value_Q>0)), assign Value_I as 1 and Value_Q as 0;
If ((Value_I<0) and (Value_Q<0)), assign Value_I as −1 and Value_Q as 0;
Thus, the formed four-point QPSK is transformed into a two-point constellation for the constellation demapper to decode the two constellation points into the original un-encoded bit 815.

When the number of un-encoded bits is equal to three, instead of obtaining 8-QAM constellation, a constellation of 12 points (12 points instead of 8) is formed (e.g., similar to FIG. 10). In order to obtain a standard 8-QAM to be able to hard-demap the three un-encoded bits, an additional transformation is performed as follows:

When slicing the transformed soft symbol received from 807, an additional step shall be done to obtain a 8-QAM constellation:
Set slicer_I as the real part of the sliced transformed soft symbol;
Set slicer_Q as the imaginary part of the sliced transformed soft symbol;
if ((slicer_I=−1) and (slicer_Q=3)), assign slicer_Q as −3;
else if ((slicer_I=1) and (slicer_Q=−3)) assign slicer_Q as 3;
else if ((slicer_I=−3) and (slicer_Q=−1)) assign slicer_I as 3;
else if ((slicer_I=3) and (slicer_Q=1)) assign slicer_I as −3;
Thus, the formed 12-point constellation is transformed into a 8-QAM for the constellation demapper to decode the eight constellation points into the three original un-encoded bits 815.

Figure 11:
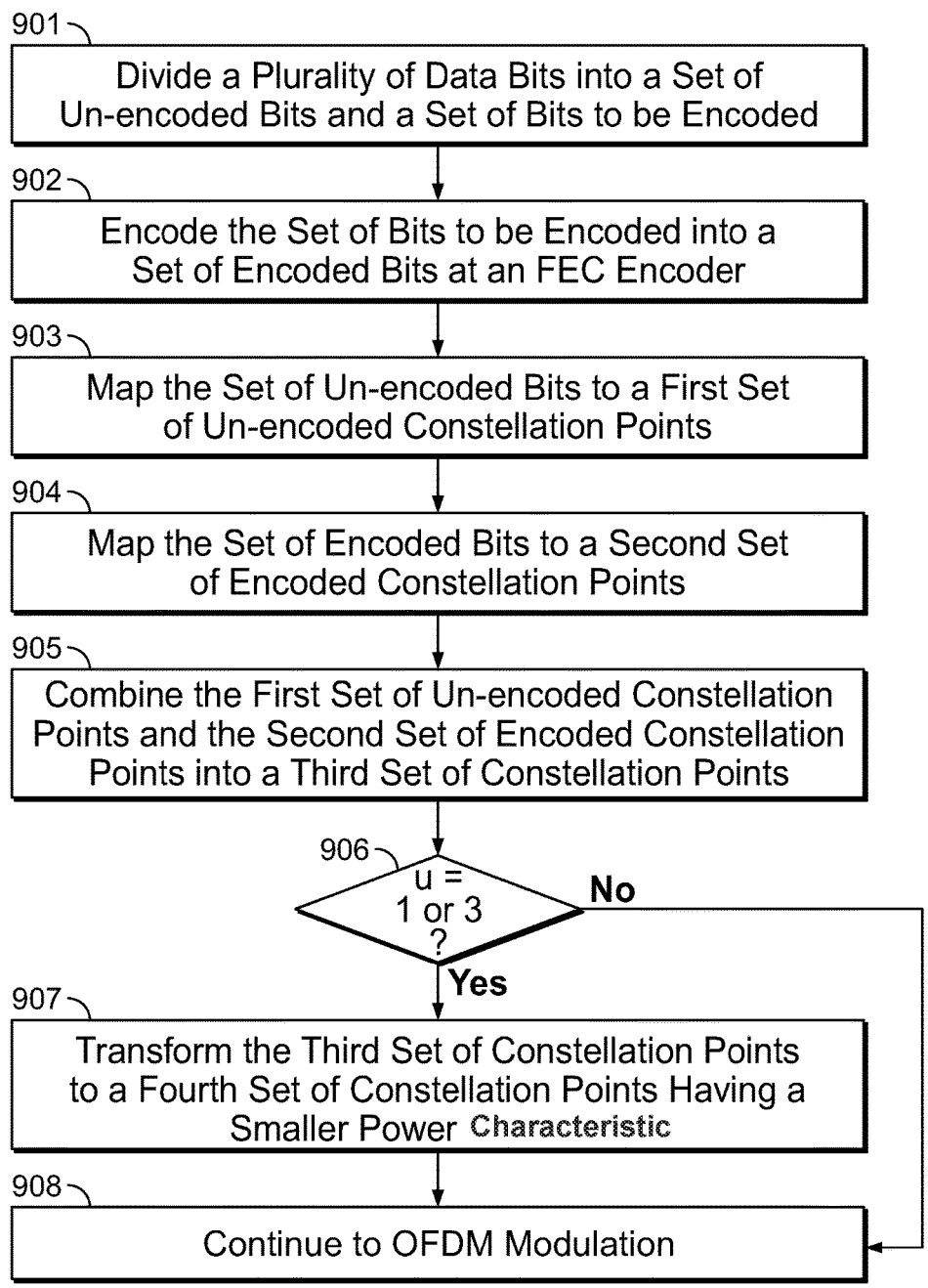
FIG. 11 is a flow diagram illustrating a work flow of the multi-level encoding scheme described in FIG. 1, according to some embodiments described herein.

FIG. 11 provides a logic flow diagram illustrating a process of the multi-level encoding scheme, according to some embodiments described herein. At 901, a plurality of data bits to be transmitted (e.g., 100 in FIG. 1) are divided, e.g., by the MLC pre-processor 101 in FIG. 1, into a set of un-encoded bits (e.g., 107 in FIG. 1) and a set of bits to be encoded (e.g., 109 in FIG. 1). At 902, the set of bits to be encoded are encoded at an FEC encoder (e.g., see 102 in FIG. 1) into a set of encoded bits (e.g., see 110 in FIG. 1). At 903, the set of un-encoded bits are mapped to a first set of un-encoded constellation points (e.g., see constellation 402 in FIG. 4). At 904, the set of encoded bits are mapped to a second set of encoded constellation points (e.g., see constellation 401 in FIG. 4). At 905, the first set of un-encoded constellation points and the second set of encoded constellation points are combined into a third set of constellation points (e.g., see constellation 405 in FIG. 4). Specifically, when the number of the un-encoded bits equals one or three at 906, i.e., u=1 or 3, the third set of constellation points are transformed to a fourth set of constellation points that have a smaller power characteristic at 907. For example, the power characteristic is calculated as the sum of absolute squares of the constellation points, which is indicative of the energy of the constellation required to transmit the constellation points in the constellation. For example, the constellation 603 in FIG. 6 has a higher average symbol energy than the cross-shaped constellation 604 in FIG. 6; and the constellation 703 in FIG. 7 has a higher average symbol energy than the diamond-shaped constellation 704 in FIG. 7. When the number of the un-encoded bits does not equal to one or three at 906, or otherwise after the transformation at 907, the resulting constellation continues to be processed at OFDM modulation (e.g., see OFDM modulator 105 in FIG. 1).

The multi-level coding scheme described in FIGS. 1-9 significantly reduces the throughput requirement for the FEC decoder 805 as only some of the received bits are passed through it for decoding. Also a higher coding rate is achieved by using the same error correcting code. For example, if the rate of the error correcting code is equal to 5/6 but roughly half of the bits transmitted are encoded and the other half of the bits transmitted are un-encoded, the effective final rate is improved to 11/12.

Figure 12:
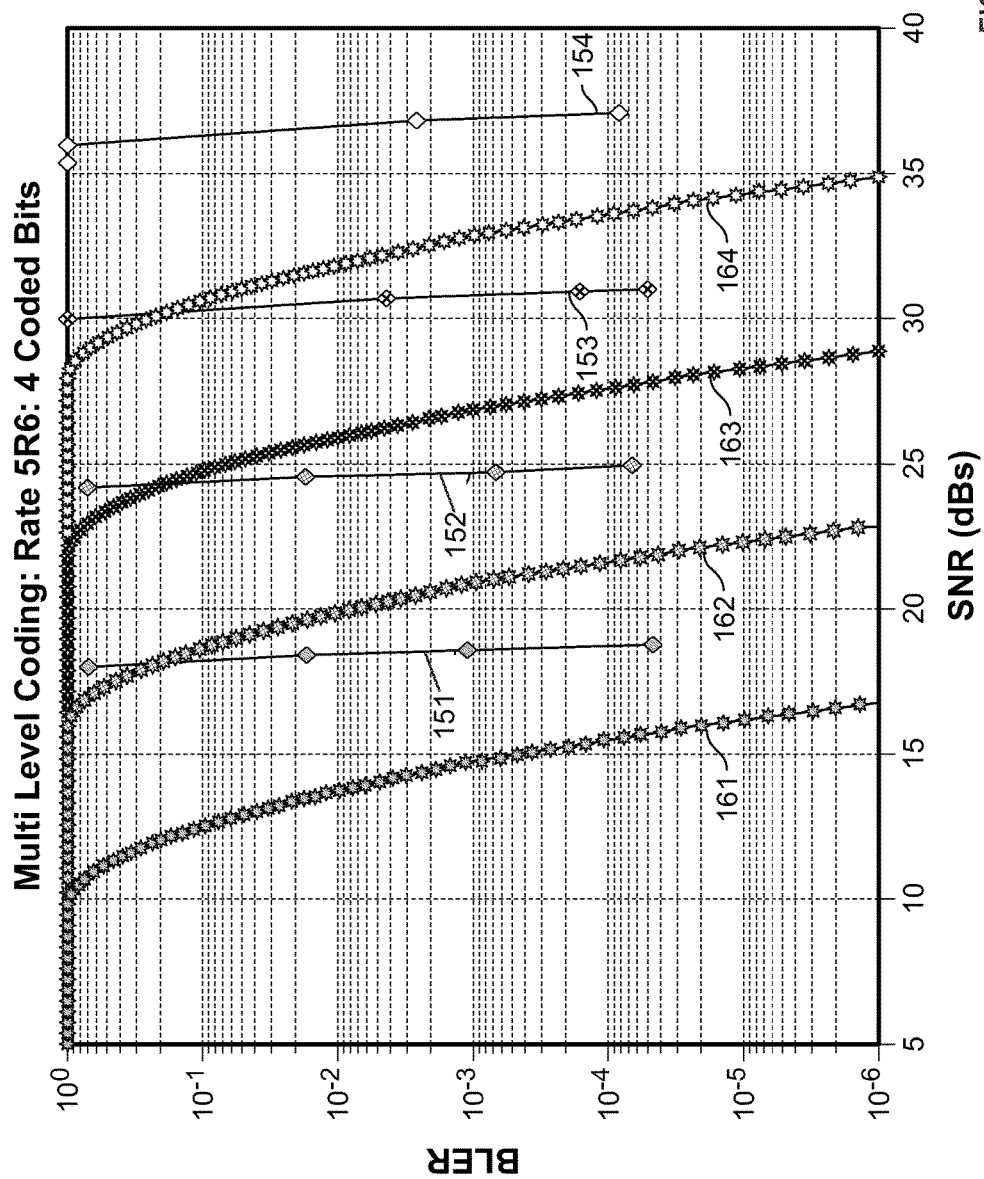
FIGS. 12-13 are example data plot diagrams illustrating performance of the multi-level coding scheme discussed in FIGS. 1-11, according to some embodiments described herein.
Figure 13:
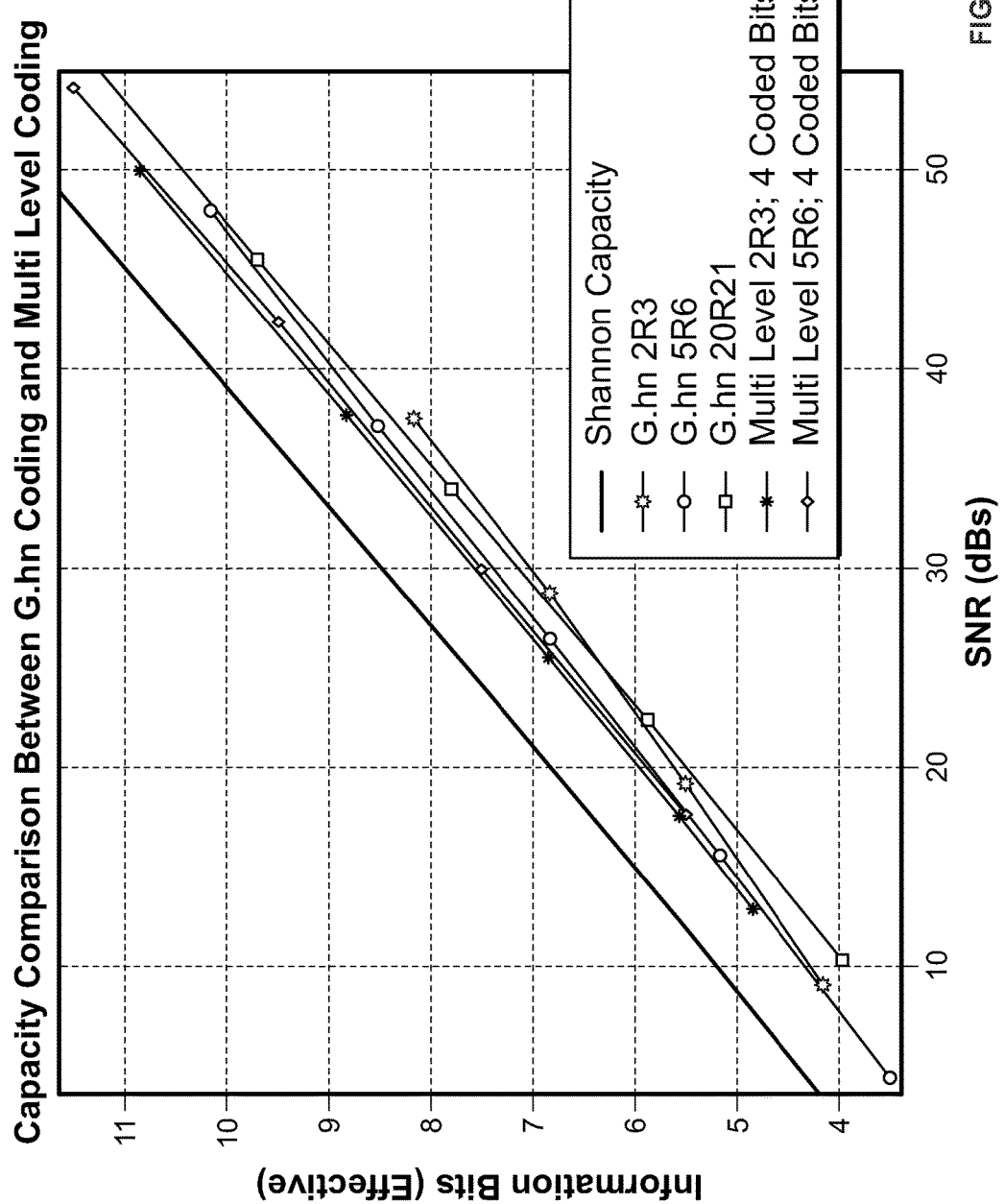

FIGS. 12-13 provide example data plot diagrams illustrating performance of the multi-level coding scheme discussed in FIGS. 1-11, according to some embodiments described herein. As shown in FIG. 12, the block error rate (BLER) vs. SNR curves for the multi-level coding scheme are provided. In this example, the number of encoded bits is equal to four and the total number of bits per channel use (BPC) of each subcarrier is equal to six, eight, ten and twelve, respectively. The error correcting code used is the G.hn LDPC 5R6 540 byte. The curves 151-154 marked with circles (-○-) are the resulting BLER vs SNR curves of the whole communication system using the multi-level coding scheme in a flat additive white Gaussian noise (AWGN) channel, wherein curves 151, 152, 153 and 154 correspond to performance in subcarriers of six BPCs, eight BPCs, ten BPCs, and 12 BPCs, respectively. The curves 161-164 marked with asterisks (-*-) are the BLER vs SNR curves for the un-encoded bits, wherein curves 161, 162, 163 and 164 correspond to performance in subcarriers of six BPCs, eight BPCs, ten BPCs, and 12 BPCs, respectively. Thus, the gain obtained with the multi-level constellation is higher than the coding gain offered by the LDPC, as the error performance of the un-encoded bits is superior to that of the whole system, if the objective BLER of the system is around 1e-4.

As shown in FIG. 13, a capacity comparison is performed between the current G.hn coding scheme and the proposed multi-level coding scheme, in an embodiment. The Shannon limit is displayed for reference. The SNR points are chosen for an objective BLER equal to 1e-4. It can be seen that the proposed multi-level coding scheme (with four encoded bits) outperforms the current G.hn scheme, as achieving higher information bits capacity.

Various embodiments discussed in conjunction with FIGS. 1-11 are performed by various electronic components of one or more electronic circuits, such as but not limited to an integrated circuit, and/or the like. Various components discussed throughout this disclosure such as, but not limited to the MLC pre-processor 101, FEC encoder 102, tone mapper 103, constellation encoder 104, OFDM 105 in FIG. 1, the MLC post-processor 806, FEC decoder 805, LLR calculator 804, RX equalizer 803, OFDM demodulator 802, constellation demapper 808 and soft symbol buffer 807 in FIG. 8, and/or the like, are configured to include a set of electronic circuit components, and communicatively operate on one or more electronic circuits. Each electronic circuit is configured to include any of, but not limited to logic gates, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIG. 10 does not necessarily require the particular order shown, or sequential order, to achieve desirable results. In certain implementations, multitasking and parallel processing may be advantageous. Other variations are within the scope of the following claims.

What is claimed is:

1. A method for performing multi-level coding in a discrete multitone modulation (DMT) communication system, the method comprising:
   dividing, at a pre-processor, a plurality of data bits into a first number of un-encoded bits and a set of bits to be encoded;
   encoding, at a forward error correcting (FEC) encoder, the set of bits to be encoded into a second number of encoded bits,
      wherein the first number is different from the second number, and the first number is an even number or an odd number;
   mapping, at a constellation encoder, the first number of un-encoded bits and the second number of encoded bits into a plurality of constellation points having a first constellation shape and a first power attribute;
   transforming the plurality of constellation points into a second plurality of constellation points having a second constellation shape and a second power attribute that is smaller than the first power attribute when the first number equals one or three; and
   transmitting the plurality of constellation points as orthogonal frequency-division multiplexing (OFDM) symbols.

2. The method of claim 1, further comprising:
   obtaining adaptive bitloading information indicative of a total number of bits to be loaded and the number of un-encoded bits, the adaptive bitloading information being generated based at least in part on channel signal-to-noise ratio (SNR) condition; and
   dividing the plurality of data bits into the first number of un-encoded bits and the set of bits to be encoded based on the adaptive bitloading information.

3. The method of claim 1, further comprising:
   mapping the first number of un-encoded bits into a first set of un-encoded constellation points;
   mapping the second number of encoded bits into a second set of encoded constellation points, wherein the first set of un-encoded constellation points has a different scale from the second set of encoded constellation points.

4. The method of claim 3, further comprising:
   scaling the first set of un-encoded constellation points by a value equivalent to a square root of a value equivalent to $2^{the\ second\ number}$ to obtain a scaled set of un-encoded constellation points.

5. The method of claim 4, further comprising:
   adding each scaled un-encoded constellation point from the scaled set of un-encoded constellation points to each encoded constellation point from the second set of encoded constellation points to obtain the plurality of constellation points.

6. The method of claim 1, further comprising:
   when the number of the un-encoded bits equals one, rearranging a subset of the plurality of constellation points to form the second plurality of constellation points having a diamond shape.

7. The method of claim 1, further comprising:
   when the number of the un-encoded bits equals three, rearranging a subset of the plurality of constellation points to form the second plurality of constellation points having a cross shape.

8. The method of claim 1, further comprising:
   generating a plurality of soft symbols from a plurality of received symbols;
   recovering the second number of encoded bits from the plurality of soft symbols; and
   decoding by an FEC decoder the second number of encoded bits into the set of bits to be encoded based on log-likelihood ratio calculation.

9. The method of claim 8, further comprising:
   recovering the first number of un-encoded bits from the plurality of soft symbols based at least in part on a constellation generated by the second number of encoded bits; and
   mixing the first number of un-encoded bits and the set of bits to be encoded as an output of data bits.

10. A system for multi-level coding in discrete multitone modulation (DMT) communication, the system comprising:
    a multi-level coding (MLC) pre-processor configured to divide a plurality of data bits into a first number of un-encoded bits and a set of bits to be encoded;
    a forward error correcting (FEC) encoder configured to encode the set of bits to be encoded into a second number of encoded bits,
       wherein the first number is different from the second number, and the first number is an even number or an odd number;
    a constellation encoder configured to:
    map the first number of un-encoded bits and the second number of encoded bits into a plurality of constellation points having a first constellation shape and a first power attribute, and
    transform the plurality of constellation points into a second plurality of constellation points having a second constellation shape and a second power attribute that is smaller than the first power attribute when the first number equals one or three; and
    a transmitter configured to transmit the plurality of constellation points as orthogonal frequency-division multiplexing (OFDM) symbols.

11. The system of claim 10, wherein the MLC pre-processor is further configured to:
    obtain adaptive bitloading information indicative of a total number of bits to be loaded and the number of un-encoded bits, the adaptive bitloading information being generated based at least in part on channel signal-to-noise ratio (SNR) condition; and
    divide the plurality of data bits into the the first number of un-encoded bits and the set of bits to be encoded based on the adaptive bitloading information.

12. The system of claim 10, wherein the constellation encoder is further configured to:
    map the first number of un-encoded bits into a first set of un-encoded constellation points;
    map the second number of encoded bits into a second set of encoded constellation points, wherein the first set of un-encoded constellation points has a different scale from the second set of encoded constellation points.

13. The system of claim 12, wherein the constellation encoder is further configured to:
    scale the first set of un-encoded constellation points by a value equivalent to a square root of a value equivalent to $2^{the\ second\ number}$ to obtain a scaled set of un-encoded constellation points.

14. The system of claim 13, wherein the constellation encoder is further configured to:
    add each scaled un-encoded constellation point from the scaled set of un-encoded constellation points to each encoded constellation point from the second set of encoded constellation points to obtain the plurality of constellation points.

15. The system of claim 10, wherein the constellation encoder is further configured to:
when the number of the un-encoded bits equals one, rearranging a subset of the plurality of constellation points to form the second plurality of constellation points having a diamond shape.

16. The system of claim 10, wherein the constellation encoder is further configured to:
when the number of the un-encoded bits equals three, rearranging a subset of the plurality of constellation points to form the second plurality of constellation points having a cross shape.

17. The system of claim 10, further comprising:
a receiver equalizer configured to generate a plurality of soft symbols from a plurality of received symbols; and
a FEC decoder configured to recover the second number of encoded bits from the plurality of soft symbols, and
decode by the FEC decoder the second number of encoded bits into the set of bits to be encoded based on log-likelihood ratio calculation.

18. The system of claim 17, further comprising:
a constellation decoder configured to recover the first number of un-encoded bits from the plurality of soft symbols based at least in part on a constellation generated by the second number of encoded bits; and
mix the first number of un-encoded bits and the set of bits to be encoded as an output of data bits.

* * * * *